(12) United States Patent
Taboada et al.

(10) Patent No.: US 7,215,855 B2
(45) Date of Patent: May 8, 2007

(54) CONES AND CYLINDERS OF LASER LIGHT

(76) Inventors: John Martin Taboada, 12718 Cranes Mill, San Antonio, TX (US) 78230; John Taboada, 12530 Elm Country, San Antonio, TX (US) 78230

( * ) Notice: Subject to any disclaimer, the term of this patent is extended or adjusted under 35 U.S.C. 154(b) by 295 days.

(21) Appl. No.: 10/905,842

(22) Filed: Jan. 23, 2005

(65) Prior Publication Data
US 2006/0165356 A1 Jul. 27, 2006

(51) Int. Cl.
*G02B 6/04* (2006.01)
(52) U.S. Cl. .................. 385/115; 385/116; 385/120; 385/901
(58) Field of Classification Search ......... 385/115, 385/116, 120, 901
See application file for complete search history.

(56) References Cited

U.S. PATENT DOCUMENTS

| 5,652,810 | A | 7/1997 | Tipton |
| 5,708,747 | A | 1/1998 | Danckwerth |
| 5,708,748 | A | 1/1998 | Ohtomo |
| 5,898,809 | A | 4/1999 | Taboada |
| 6,538,813 | B1* | 3/2003 | Magno et al. ............ 359/443 |
| 6,710,929 | B2 | 3/2004 | Phuly |
| 7,006,306 | B2* | 2/2006 | Falicoff et al. ............ 359/800 |
| 7,006,747 | B2* | 2/2006 | Escuti et al. ............ 385/120 |
| 7,042,655 | B2* | 5/2006 | Sun et al. ............ 359/708 |
| 7,075,097 | B2* | 7/2006 | Tobiason et al. ......... 250/559.27 |

* cited by examiner

*Primary Examiner*—Frank G. Font
*Assistant Examiner*—James P. Hughes
(74) *Attorney, Agent, or Firm*—John Martin Taboada

(57) ABSTRACT

A cone-of-light projection system projects a shell of laser light (or other electromagnetic radiation) using a fiber-optic bundle. Incidence optics directs a laser beam to be incident to the fiber-optic bundle at a predetermined angle of incidence, resulting in the projection of a conical shell of light. For the exemplary embodiment, the angle of incidence is non-orthogonal to the fiber-optic bundle, resulting in the projection of a conical shell of light. Thus, the laser projection technique converts a beam of laser light (or other electromagnetic radiation such as UV, visible, IR or microwave radiation) into a conically extending shell of light that in the exemplary embodiment is substantially conical. In one application, the laser projection technique can be used in industrial applications to assist in joining a cylindrical element to another surface.

22 Claims, 4 Drawing Sheets

CONES AND CYLINDERS OF LASER LIGHT

FIELD OF THE INVENTION

The present invention relates to alignment and reference equipment, particularly to methods and apparatus for generating cones and cylinders of laser light.

DESCRIPTION OF THE RELATED ART

In many industrial applications, cylindrical or conical components are joined to other components. Having a simple, accurate, cost-effective, and easy-to-use apparatus would be helpful in combining such components. Laser light cones and cylinders are useful in projecting a pattern of the cylindrical or conical components and using the laser light as a template for joining the components.

Without limiting the scope of the invention, the background information is provided in the context of a specific problem to which the invention has application: projecting a laser reference cone or cylinder with a minimum of moving parts and critical adjustments.

Existing layout, measurement, and projection laser instruments, such as that shown in U.S. Pat. No. 6,720,929 to Phuly et. al. are too sensitive to laser alignment. The Phuly instrument as illustrated in FIG. 1 requires that a laser beam source 5 direct a laser beam 10 to a 45 degree reflecting cone 15. This creates a laser plane 20 that is then converted to a cylinder of light 25 by reflecting off a mirrored ring 30. The Phuly instrument then requires another reflective cone surface 35 to change the cylinder of light 25 into a conical shell 40. Such a system demands relatively stringent alignment and complexity. A change of 1 arc second in the incident angle of the laser beam can cause an objectionable change in the light plane and thus to the cylinder of light. Additionally, multiple steps are required in order to produce a cone of light.

SUMMARY OF THE INVENTION

An object of the invention is to project a conical shell of electromagnetic radiation (such as laser light) without using moving parts, delicate alignment components, or multiple steps. A more specific object of the invention is to project a cylindrical shell of electromagnetic radiation.

These and other objects of the invention are achieved by a conical shell of radiation projection system that includes (a) a beam of electromagnetic radiation (such as a beam of laser light), (b) a bundle of substantially parallel dielectric waveguides, and (c) incidence optics. The incidence optics directs the beam to be incident to the bundle of dielectric waveguides at a predetermined angle incidence, such that a conical shell of radiation is projected from the bundle of dielectric waveguides.

In an exemplary embodiment, a laser beam is reflected by incidence optics to the fiber bundle with non-perpendicular incidence, such that a conical shell of radiation is projected from the fiber bundle. The beam dimensions are kept within the subtense of the fiber optic bundle.

Embodiments of the invention may be implemented to realize one or more of the following technical advantages of the invention. The laser projection technique directly converts a beam of laser light (or other electromagnetic radiation such as UV, visible, IR or microwave radiation) into a conical shell of light. The laser cone projection system can be economically manufactured to alleviate complex manufacturing and operational requirements. In one application, the laser cone projection technique can be used as a reference marker in industrial applications to assist in joining a cylindrical element to another element.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

DETAILED DESCRIPTION OF THE PREFERRED EMBODIMENTS

This Detailed Description describes an exemplary embodiment of the conical shell of radiation projection system used to convert a laser beam into a projected conical shell of laser light. The term "conical shell" is used to refer to a conical shell of any form of collimated electromagnetic radiation (i.e., a "shell of radiation"), including visible laser light, but also including non-visible electromagnetic radiation (such as UV, infrared, millimeter wave, and microwave).

The exemplary laser conical shell projection system involves directing a laser beam non-orthogonal to a fiber-optic bundle, i.e., a fused bundle of individual fiber optic filaments. The incident laser light is projected conically outward from the fiber optic bundle forming a laser light conical shell. The longitudinal axis of the fiber optic bundle is the axis of the resulting conical laser light shell.

Figure 1:
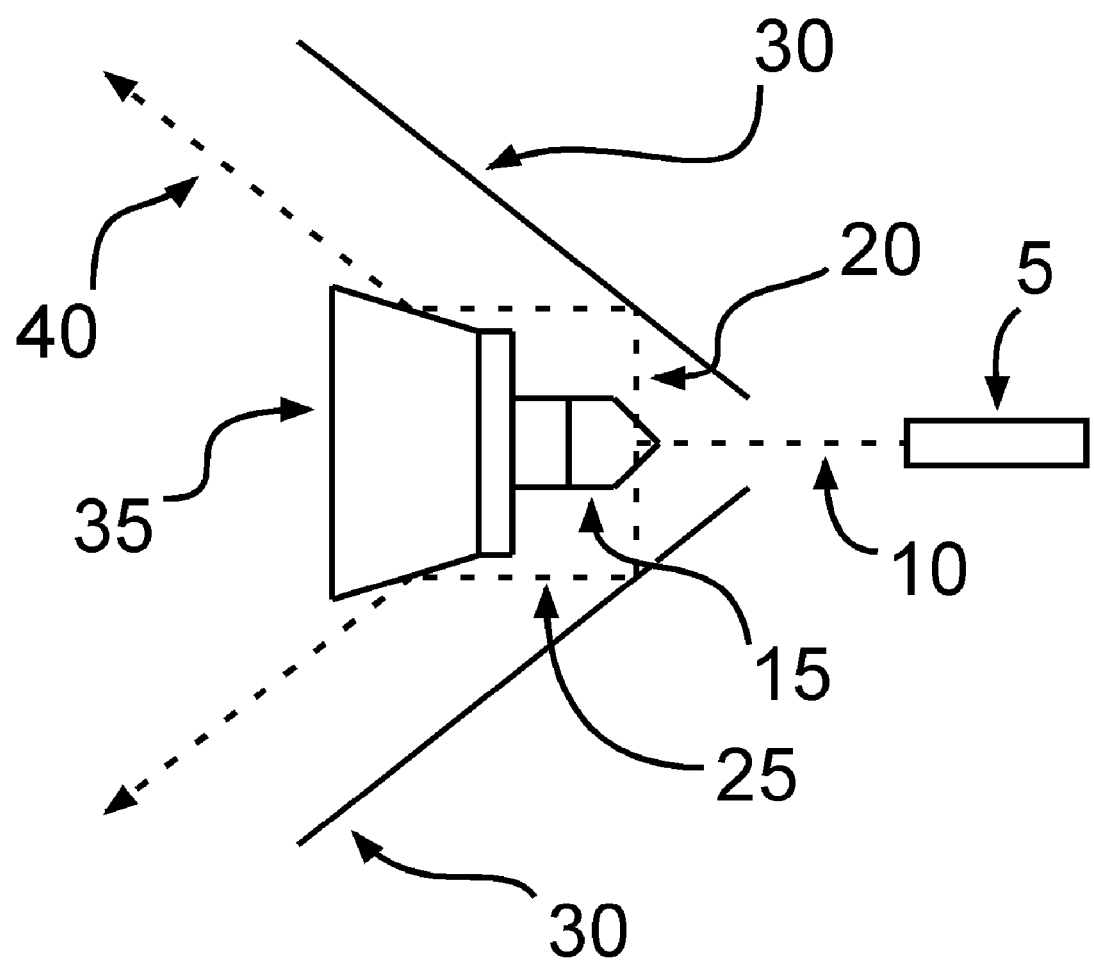
FIG. 1 is a cross sectional illustration of the use in the prior art of a reflecting cone to produce a plane, then a cylinder, and finally a conical shell by a subsequent reflection off a light diverting cone.
Figure 2:
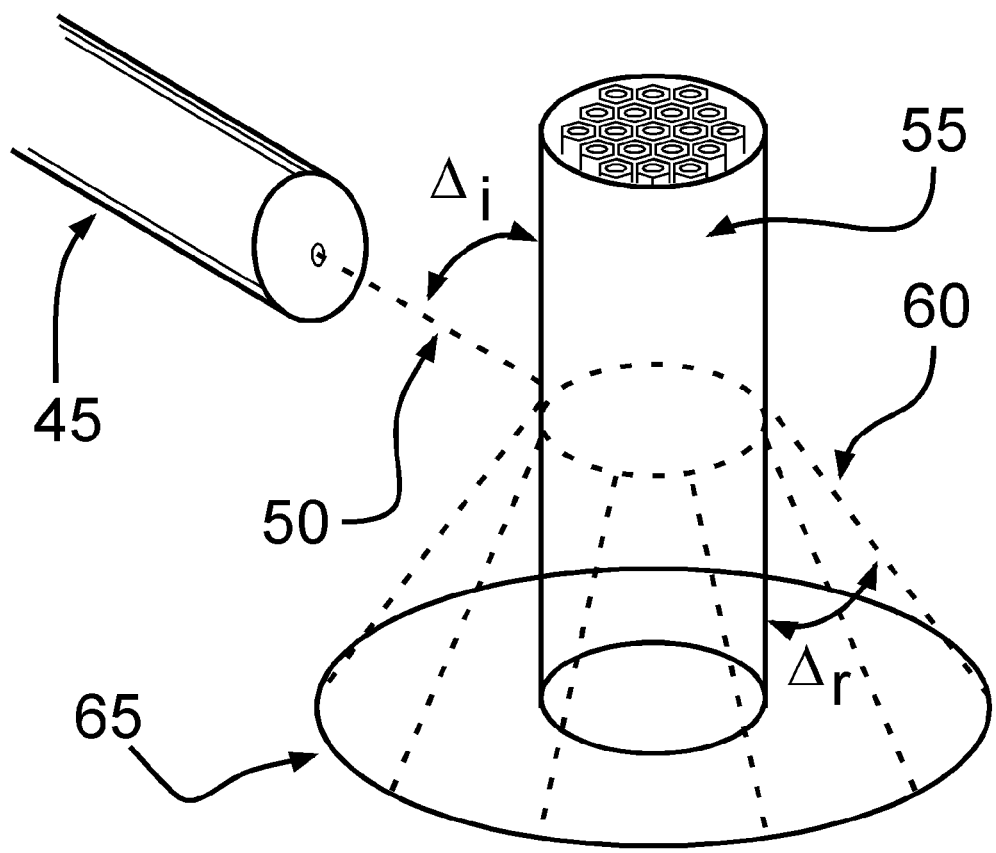
FIG. 2 illustrates projecting a conical shell according to the present invention using a laser beam incident non-perpendicular to a fused fiber optic bundle.

FIG. 2 illustrates the laser conical shell projection technique, projecting a laser conical shell according to the invention using a laser beam incident non-orthogonal to a fiber-optic bundle.

A laser beam source 45 directs beam 50 to a fiber-optic bundle 55 such that the incident angle is less than 90 degrees. The incident laser beam is isotropically scattered through 360 degrees to project a conical shell of light 60. The angle of incidence $\Delta_i$ is equal to one half the apex angle $\Delta_r$ of the resulting right cone of light 60.

Alternatively, beam source 45 may be another source of collimated light, or another source of collimated electromagnetic radiation such as a maser or other form of microwave beam emitter.

The exemplary fiber optic bundle 55 is of conventional manufacture and configuration. The bundle is formed by fused individual fibers of stepped or gradient index, well known in the art, and aligned with the body of the bundle.

Figure 3:
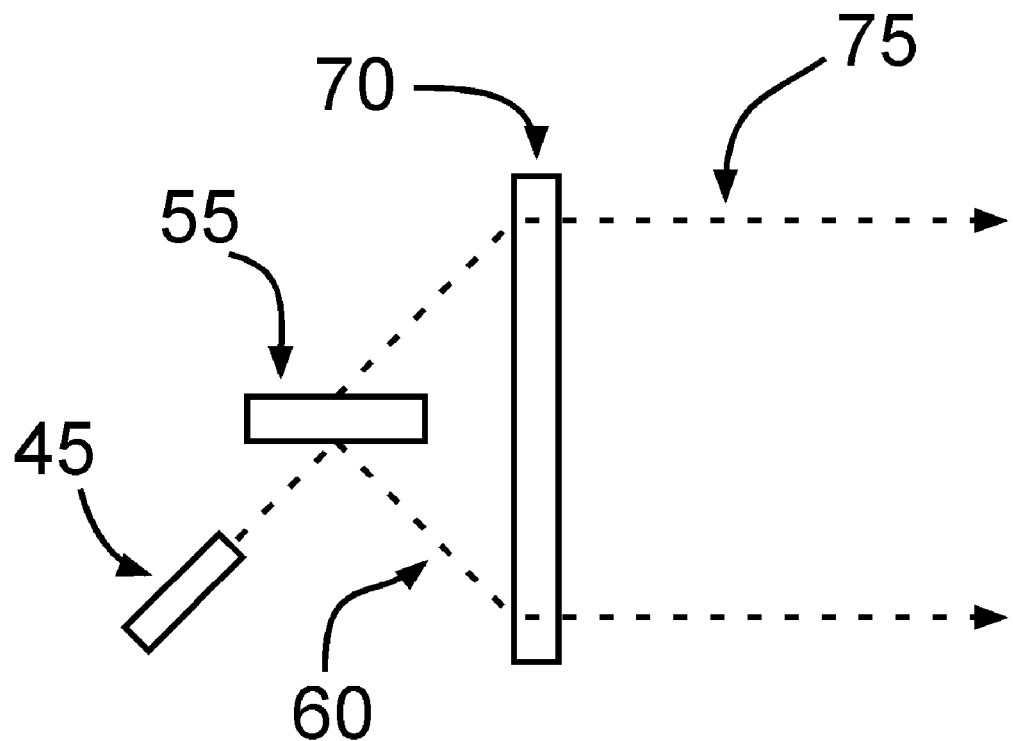
FIG. 3 is a cross sectional illustration of projecting a cylindrical shell according to the present invention using a spherical lens.

In the present invention, FIG. 3 is a cross sectional illustration of projecting a cylindrical shell using a positive power lens. The positive power lens 70 is used to collimate the conical shell 60 to produce a cylindrical laser light shell 75.

Figure 4:
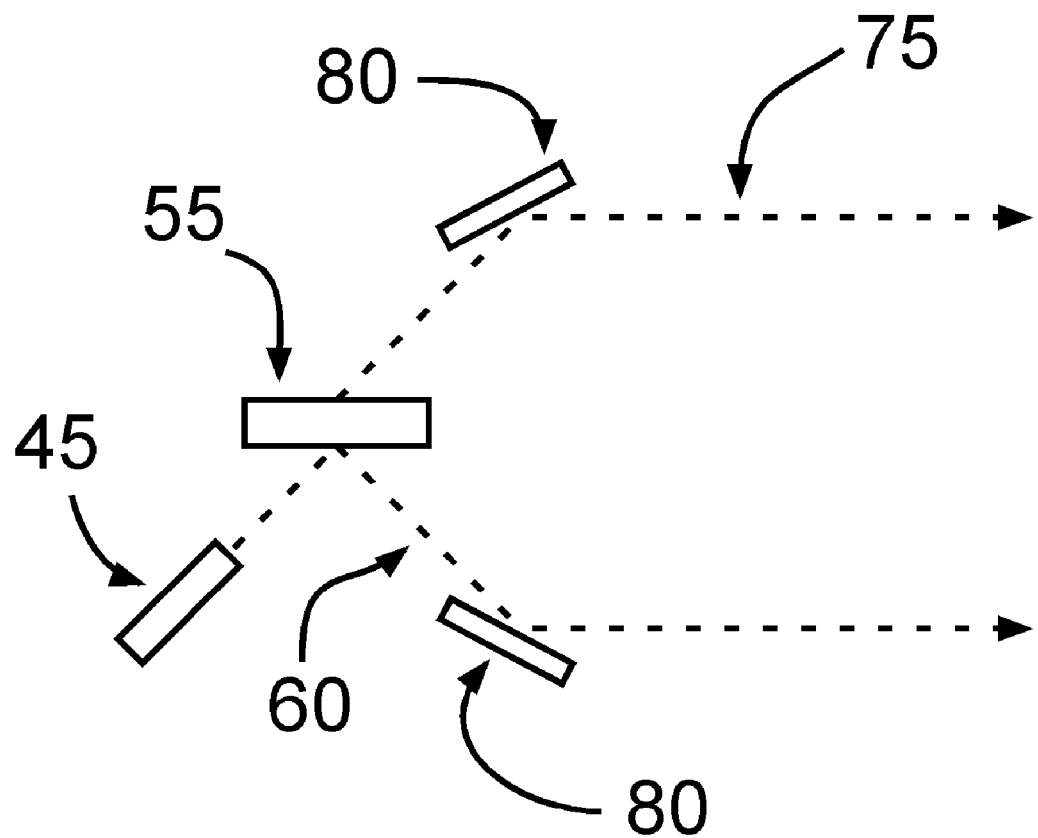
FIG. 4 is a cross sectional illustration of projecting a cylindrical shell according to the present invention using a reflecting ring.

In the present invention, FIG. 4 is a cross sectional illustration of projecting a cylindrical shell using the inner surface of a mirrored ring. The mirrored ring 80 is used to collimate the conical shell 60 to produce a cylindrical laser light shell 75.

It is understood that the present invention is not limited to the embodiments described above, but encompasses any and all embodiments within the scope of the following claims.

What is claimed is:

1. A conical shell of radiation projection system comprising:
   a source of a beam of electromagnetic radiation;
   a bundle of substantially parallel dielectric waveguides; and
   incidence optics, optically coupled to the beam source, that directs the beam, to be incident to the bundle of dielectric waveguides at a predetermined angle of incidence;
   such that a conical shell of radiation is projected from the bundle of dielectric waveguides.

2. The conical shell of radiation projection system of claim 1, wherein the bundle of dielectric waveguides comprises a bundle of fiber-optic waveguides.

3. The conical sheet of radiation projection system of claim 2, wherein the fiber-optic bundle is formed by fused optical fibers.

4. The conical shell of radiation projection system of claim 2, wherein the fibers have characteristic transverse dimensions on the order of a few multiples of the wavelength of the radiation.

5. The conical shell of radiation projection system of claim 1, wherein the bundle of dielectric waveguides comprises a bundle of substantially cylindrical rod elements with radially varying dielectric constants.

6. The conical shell of radiation projection system of claim 1, wherein the beam of collimated radiation comprises a laser beam.

7. The conical shell of radiation projection system of claim 1, wherein the dielectric waveguides are substantially cylindrical dielectric elements having media with radially varying dielectric constant or index of refraction.

8. A method of projecting a substantially uniform conical shell of electromagnetic radiation, comprising the steps:
   generating a beam of electromagnetic radiation;
   directing the beam to be incident to a bundle of dielectric waveguides at a predetermined angle of incidence;
   such that a conical shell of radiation is projected from the bundle of dielectric waveguides.

9. The method of projecting a substantially uniform conical shell of electromagnetic radiation of claim 8, wherein the fiber-optic bundle is formed by fused fiber optic waveguides.

10. The method of projecting a substantially uniform conical shell of electromagnetic radiation of claim 9, wherein the fibers have characteristic transverse dimensions on the order of the wavelength of the radiation.

11. The method of projecting a substantially uniform conical shell of electromagnetic radiation of claim 8, wherein the angle of incidence of the beam of electromagnetic radiation is non-orthogonal to the major axis of said bundle of dielectric waveguides.

12. The method of projecting a substantially uniform conical shell of electromagnetic radiation of claim 8, wherein the step of directing is accomplished by a mirror that reflects the beam to the bundle of dielectric waveguides.

13. The method of projecting a substantially uniform conical shell of electromagnetic radiation of claim 8, wherein the beam of electromagnetic radiation comprises a laser beam.

14. The method of projecting a substantially uniform conical shell of electromagnetic radiation of claim 8, wherein the bundle of dielectric waveguides comprises a fiber-optic bundle.

15. A laser cone projection system that projects a substantially conical shell of light, comprising:
   a laser beam source;
   a bundle of dielectric waveguides that is substantially cylindrical; and
   incidence optics, optically coupled to the laser beam source, that directs the laser light beam to be incident to said bundle at a non-orthogonal angle of incidence;
   such that a substantially conical shell of light is projected from said bundle.

16. The laser cone projection system of claim 15, wherein the bundle of dielectric waveguides comprises a fiber-optic bundle.

17. The laser cone projection system of claim 16, wherein the fiber-optic bundle is formed by fused fibers.

18. The laser cone projection system of claim 15, wherein the incidence optics comprises a mirror that reflects the beam from the source to the bundle of dielectric waveguides.

19. The laser cone projection system of claim 16, wherein the fibers have characteristic transverse dimensions on the order of a few multiples of the wavelength of the radiation.

20. A cylindrical shell of radiation projection system comprising:
   a source of a beam of electromagnetic radiation;
   a bundle of substantially parallel dielectric waveguides;
   incidence optics, optically coupled to the beam source, that directs the beam, to be incident to the bundle of dielectric waveguides at a predetermined angle of incidence to produce a conical shell; and
   an optic used to collimate said conical shell;
   such that a cylindrical shell of radiation is projected.

21. The cylindrical shell projection system of claim 20, wherein the optic is a spherical lens.

22. The cylindrical shell projection system of claim 20, wherein the optic is a mirrored conical ring sector.

* * * * *